UNITED STATES PATENT OFFICE.

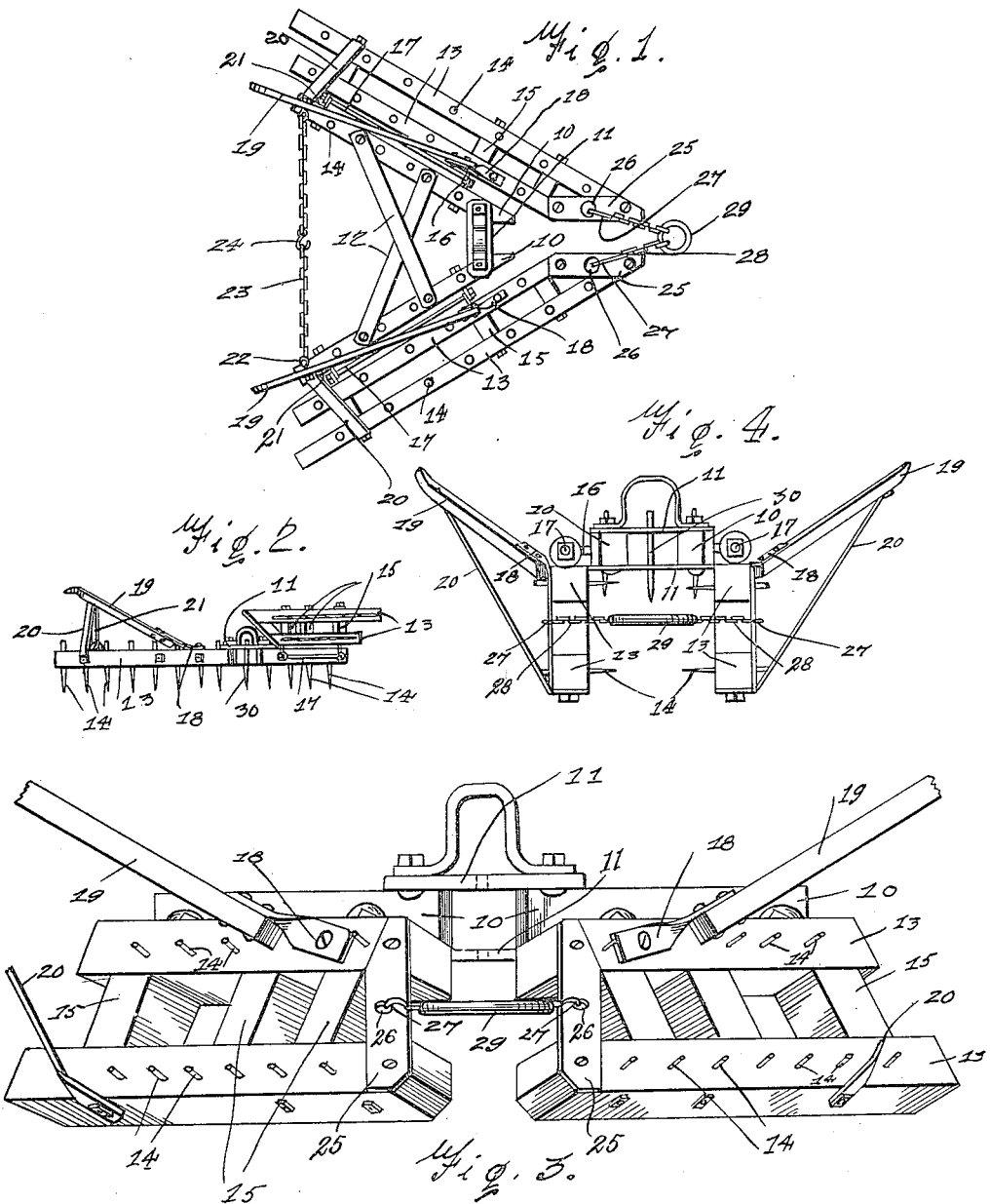

JOHN W. BARNARD, OF TRENTON, TENNESSEE, ASSIGNOR OF ONE-HALF TO WILLIAM T. INGRAM, OF TRENTON, TENNESSEE.

HARROW.

1,140,238. Specification of Letters Patent. Patented May 18, 1915.

Application filed July 7, 1914. Serial No. 849,456.

*To all whom it may concern:*

Be it known that I, JOHN W. BARNARD, a citizen of the United States, residing at Trenton, in the county of Gibson, State of Tennessee, have invented certain new and useful Improvements in Harrows; and I do hereby declare the following to be a full, clear, and exact description of the invention, such as will enable others skilled in the art to which it appertains to make and use the same.

This invention relates to improvements in cultivating implements and particularly to harrows.

One object of the invention is to provide a harrow which is adaptable for various classes of work and is an improvement on my prior Patent, No. 675,536, issued June 4, 1901 for a farm harrow.

Another object is to provide a harrow which is capable of adjustment during the operation to avoid any obstructions.

Another object is to provide a harrow which can be adjusted to cultivate the row or bed prior to the setting out of the plants, and which can also be so adjusted as to cultivate on both sides of the row of plants.

Other objects and advantages will be apparent from the following description, when taken in connection with the accompanying drawings.

In the drawings: Figure 1 is a plan view of the harrow showing the same in position for general harrowing. Fig. 2 is a front elevation showing one side of the harrow raised to clear a stump or other obstruction. Fig. 3 is a front elevation of the harrow in a position for cultivating, enlarged. Fig. 4 is a front elevation of the device in folded position ready to drag to or from a field.

Referring particularly to the accompanying drawings, 10—10 represent a pair of sills, the forward ends of which are pivotally connected to a pair of plates 11 and are held in forwardly divergent relation with each other by means of the crossed braces 12. Arranged on the outer side of the edge of the sills 10 are the parallel sills 13 which carry the spiked harrow teeth 14, and are spaced apart by means of the blocks 15. Both the inner sill 13 and the sill 10 carry the eyes 16 which register and receive the longitudinally extending pivot bolt 17 on which the frame comprising the sills 13 and the blocks 15 is adapted to swing. Rigidly secured to the inner sill 13, adjacent the forward end is a bracket 18 to which is connected the lower end of an upwardly and rearwardly extending handle member 19. Extending from the upper portion of the handle member to the outer sill 13 is an inclined brace 20 while carried rigidly by the inner side of the handle and loosely connected to the rear end of the sill 10 is a vertical brace member 21. Both the braces 20 and 21 are connected to the handle 19 by means of an eye bolt 22, and carried by the eye portions of these bolts are sections of chains 23, one of the chains being provided with a hook 24 for interchangeable engagement with the links of the other section. The forward end of the sills 13 carry plates 25 each of which is provided with an opening 26 in which is engaged the hook 27 of a chain 28. As clearly seen in the drawings, there are two of these harrow frames, the other one being identical in construction to one just described, and connecting the chains 28 of the two plates 25 is a ring 29 adapted for attachment of a draft device (not shown).

Formed vertically through the plates 11 are openings which receive a detachable harrow tooth 30. In cultivating the bed of a row, this tooth is arranged to stir up the soil along the middle of the row or hill and when removed permits the teeth of the side frames to stir up the soil at the sides of the middle line of the row. This is particularly useful when sets are in the ground or when the plants have just come above the ground, the harrow being then in the middle of a straddle row device.

When cultivating the sides of the bed the handles 19 are pushed outwardly away from each other so as to tilt the outer sides of the harrow frame downwardly so that it will engage on the inclined side of the bed. When it is desired to pass a stump or other obstruction, the harrow frame on that particular side of the device can be swung upwardly by tilting one of the handles 19 inwardly toward the center of the device.

By detaching the rear ends of the braces 12, the harrow may be folded into the position shown in Fig. 4, whereupon the same may be dragged to or from the field.

What is claimed is:

A harrow comprising forwardly convergent sill members pivotally connected at their forward ends, detachable means for holding the sills in convergent relation, harrow frames hinged to the said sills, the forward ends of the harrow frames carrying apertured plates for attachment of draft means, handles rigidly connected with the inner sides of the harrow frames and braced at their upper portions to the outer sides of the frames, bracing and spacing means rigidly connected to the handle members and loosely connected to the sills, and flexible spacing and retaining members carried by the handles and arranged for interlocking connection with each other.

In testimony whereof, I affix my signature, in the presence of two witnesses.

JOHN W. BARNARD.

Witnesses:
MASON INGRAM,
DAVID NOWELL.

Copies of this patent may be obtained for five cents each, by addressing the "Commissioner of Patents, Washington, D. C."